United States Patent [19]

Dossier

[11] Patent Number: 4,872,645
[45] Date of Patent: Oct. 10, 1989

[54] COIL SPRING COMPRESSOR

[75] Inventor: Michel Dossier, Paris, France

[73] Assignee: Facom, Morangis, France

[21] Appl. No.: 227,251

[22] Filed: Aug. 2, 1988

[30] Foreign Application Priority Data

Aug. 7, 1987 [FR] France ............................ 87 11325

[51] Int. Cl.⁴ ............................................... B60P 1/48
[52] U.S. Cl. ..................................... 254/10.5; 29/227; 267/177
[58] Field of Search ............... 267/166, 177, 286, 287; 29/226, 227; 254/10.5, 98, 133 R; 384/42

[56] References Cited

U.S. PATENT DOCUMENTS

| | | | |
|---|---|---|---|
| 2,708,374 | 5/1955 | Engh | 254/98 X |
| 2,755,065 | 7/1956 | Nilson | 254/133 R X |
| 2,980,397 | 4/1961 | Lucker | 254/133 R X |
| 3,376,082 | 4/1968 | Soder | 384/42 |
| 3,520,527 | 7/1970 | Persson | |
| 3,747,895 | 7/1973 | Martin | 29/227 X |
| 4,732,365 | 3/1988 | Kloster | 254/105 |

FOREIGN PATENT DOCUMENTS

| | | |
|---|---|---|
| 341283 | 11/1920 | Fed. Rep. of Germany . |
| 3021084 | 12/1981 | Fed. Rep. of Germany . |
| 8617893.8 | 11/1986 | Fed. Rep. of Germany . |
| 646869 | 11/1950 | United Kingdom . |
| 866836 | 5/1961 | United Kingdom . |
| 943931 | 12/1963 | United Kingdom ................ 384/42 |
| 2017561 | 10/1979 | United Kingdom . |
| 2075133 | 11/1981 | United Kingdom ................ 384/42 |

Primary Examiner—George E. A. Halvosa
Attorney, Agent, or Firm—Wenderoth, Lind & Ponack

[57] ABSTRACT

A coil spring compressor includes two jaws, one of which is fixed at one end of a guide tube, while the other jaw is slidably mounted on such tube and connected to a slide (32) provided with a radial finger member in the shape of a wedge extending through a slot in the tube. The slidable jaw has a body defining a bore and from which extend two claws or clamps and that is extended by a screw-threaded skirt. A radial groove having a shape complementary to the shape of the radial finger member is provided in the wall of the bore and cooperates with the finger member in the relative locking of the two elements, while a tapped ring screwed on the screw-threaded skirt completes their locking together.

8 Claims, 4 Drawing Sheets

COIL SPRING COMPRESSOR

BACKGROUND OF THE INVENTION

The present invntion relates to a compressor for coil springs, in particular for facilitating the mounting and removal of suspension springs of automobile vehicles.

It more particularly relates to spring compressors of the type comprising two jaws provided for the insertion therebetween of two-spread apart coils of the spring to be compressed and mounted in facing relation to each other, one jaw being fixed, the other slidable on a longitudinally split guide tube, and an actuating screw located on the axis of the tube for controlling the displacements of a slide which is connected to the slidable jaw.

Compressors of this type must be capable of being used for mounting or removing springs of various shapes and dimensions, i.e. must be capable of receiving interchangeable jaws of a range of dimensions which are adapted to the diameters of the springs. They must also be capable of resisting large forces and in particular axial forces such as those that the coils of an automobile vehicle suspension spring are capable of exerting thereon.

In order to satisfy the first requirement and permit adapting as desired the jaws to the springs, the jaws are generally formed by clamps or claws having a U-shape or a horse-shoe shape, the size of which corresponds to that of the coils it is desired to insert therebetween and provided with removable means for connection to the slide through a longitudinal slot in the guide tube. Unfortunately, the assembly between the jaw and the slide is liable to break under the effect of the force exerted on the claw.

It has therefore been proposed to associate with a slide placed inside the guide tube a sleeve surrounding the latter and slidable along the tube. The claw is in this case detachably mounted on the sleeve. There is less risk of breakage of the assembly between the claw and the slidable element but this risk remains. On the other hand, the friction is distinctly increased owing to the friction of the sleeve on the tube and may even in some cases prevent the sliding of the sleeve, in particular when the claws are of large size.

Further, U.S. Pat. No. 3,520,527 discloses a vice whose fixed and slidable jaws each comprise holding arms in one piece with a body which is bored at the diameter of a guide tube containing an axial screw for driving the slidable jaw through a screw-threaded radial finger member. The connection arranged in this way is complicated and relatively fragile.

SUMMARY OF THE INVENTION

An object of the present invention is to overcome these drawbacks by providing a spring compressor which permits mounting and removing springs of all diameters with very great safety, while this compressor is constructed in a particularly simple and inexpensive manner.

The invention therefore provides a coil spring compressor comprising two jaws provided for inserting therebetween two spread-apart coils of a spring to be compressed and mounted in confronting relation, one jaw being fixed while the other is slidable on a longitudinally split guide tube and each comprising in a single piece two arms forming claws or clamps and a body bore to the diameter of the guide tube, and an actuating screw placed on the axis of the tube and permitting controlling the displacements of a slide which is connected to the slidable jaw, wherein the slidable jaw is extended by a screw-threaded skirt cooperative with a ring for connection with the slide and has a profiled inner groove which has a rectangular section and a depth which increases in the direction of the screw-threaded skirt and is cooperative with a radial projection of complementary shape of the slide.

Furthermore, the slide includes a nut cooperative with the actuating screw and axially extended by a sleeve spaced from the screw and in contact with the inner surface of the guide tube at its two end portions.

Such a jaw is easily placed in position by a simple fitting on the guide tube and a locking on the slide by a screwing of the ring on the screw-threaded skirt. It can therefore be very rapidly replaced by a similar jaw of different dimensions.

On the other hand, the fact that the claws are in one piece with the bored body which surrounds the tube, to which is added the effect of the special shape of the groove of the jaw and the shape of the slide, enables this assembly to resist extremely great axial forces with no risk of a jamming of the slidable element.

The bearing forces of the slidable jaw are indeed transferred and concentrated on the part of the guide tube opposed to the slot at two points located on each side of the wall of this tube and axially remote from each other, which eliminates risk of jamming and reduces the friction opposing the sliding of the sleeve.

The outer wall of the guide tube may moreover include, opposite to the longitudinal slot, a longitudinal projecting sliding strip. The friction between the guide tube and the bore of the jaw are in this way reduced while the bearing region of this bore on the tube is laterally limited, which avoids risks of jamming.

The following description of an embodiment given by way of non-limitative example and shown in the accompanying drawings will bring out the advantages and features of the invention.

DETAILED DESCRIPTION OF THE INVENTION

Figure 2:
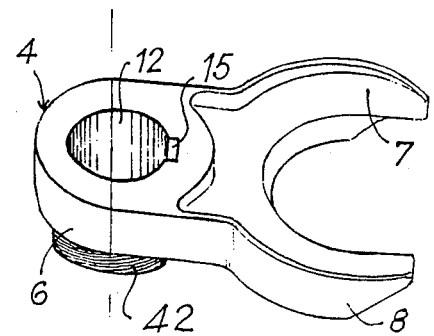
FIG. 2 is a perspective view of a slidable jaw for the compressor of FIG. 1.
Figure 1:
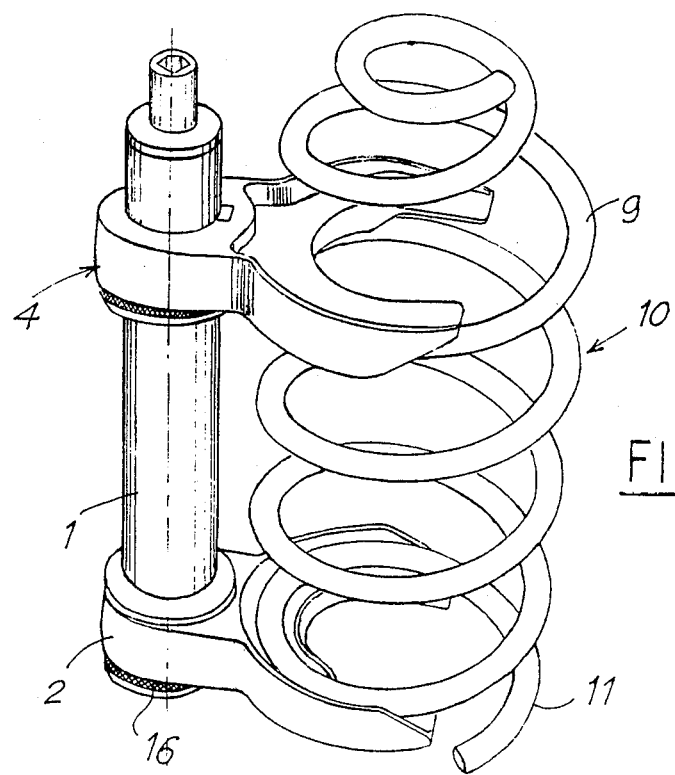
FIG. 1 is a perspective view of a spring compressor according to the invention.
Figure 3:
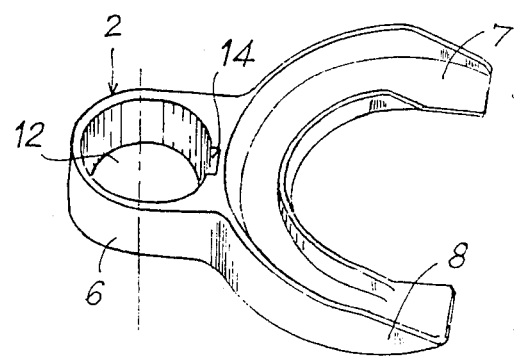
FIG. 3 is a perspective view of a fixed jaw for the compressor of FIG. 1.

The compressor for coil springs according to the invention comprises a cylindrical guide tube 1 which carries, on one hand, a fixed jaw 2 mounted at one of its ends and, on the other hand, a slidable jaw 4 which is movable relative to the fixed jaw on the tube 1.

Each of these jaws comprises a body 6 from which extend two arms 7 and 8 constituting claws or clamps and having a shape and dimension which correspond to those of one of the coils 9 or 11 of the spring 10 to be compressed. The body 6 is provided with a bore 12 whose diameter is slightly larger than that of the outer surface of the guide tube 1 and includes an axial groove 14, 15.

The jaw 2 is fixed to the end of the guide tube 1 by means of a terminal member 16 which is screwed onto the tube (FIGS. 4 and 5) and forms therearound a flange 18 while it includes a screw thread 20 at its opposite end. The fixed jaw 2 is fitted onto this terminal member 16 by means of a ring 22 which has an internal screw thread and is screwed on this screw thread 20 and clamps the jaw 2 against the flange.

The terminal member 16 is provided with a stepped bore 24 which extends axially therethrough and in which is rotatively mounted a head 25 of an actuating screw 26 which extends axially throughout the length of the guide tube and passes through a closing plate 28 whose diameter is at the most equal to the outside diameter of the tube 1 which is therefore closes at the diameter of the bore 12 of the jaw. Outside the tube 1, the screw receives a polygonal terminal member 30 for connecting it to a device controlling its rotation. This control device may be of any suitable type and is not part of he invention and will not be described here.

Mounted on the actuating screw 26 is a slide 32 which constitutes a nut 34 screwed on the screw 26 and extended by a sleeve 36 surrounding screw 26 but spaced therefrom. In its two end portions, the slide 32 is in contact with the inner surface of the tube 1 while, in its central portion, it carries a radial finger member 38 whose outer surface 39 is inclined relative to the axis of the slide and the screw so that its section increases in the direction toward the nut and the end of the tube carrying the fixed jaw 2. The radial finger member 38 extends through a longitudinal slot 40 in the tube 1 and therefore projects beyond the exterior of the tube.

The body 6 of the slidable jaw 4 is extended at the end thereof corresponding to the handling surface of the claws 7 and 8 by a cylindrical skirt 42 which has an external screw thread coaxial with the bore 12. Furthermore, this body 6 includes an axial groove 15 which is so shaped as to have a depth which increases in the direction toward the skirt 42 and a shape which is complementary to the shape of the finger member 38, which is substantially a wedge shape. Preferably, it has a rectangular sectional shape and a surface which is inclined relative to the axis of the bore 12.

Figure 4:
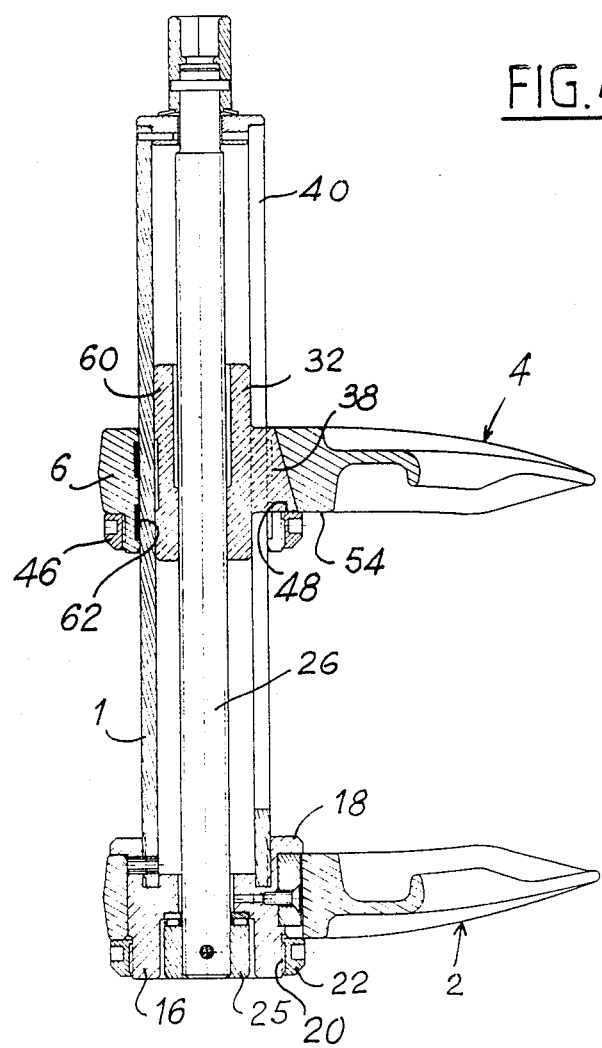
FIG. 4 is an axial sectional view of the compressor of FIG. 1.
Figure 5:
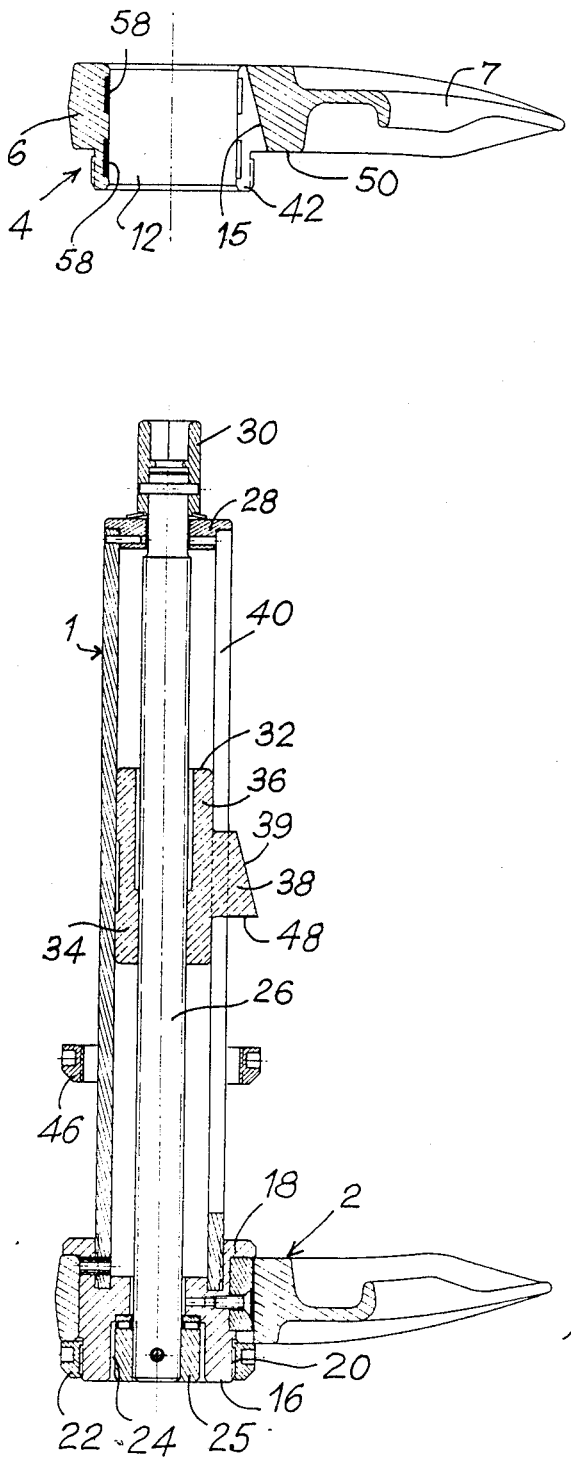
FIG. 5 is an exploded view of the spring compressor.

The jaw arranged in this way can be easily fitted on the guide tube 1, for example slid downwardly along the tube, as viewed in FIG. 5, from its end 28, so that the axial groove 15 will fit on the finger member 38 of the slide, and in this way the slide radially blocks the jaw 4 and stops its axial displacement. A ring 46, having an internal screw thread and previously mounted on the guide tube 1 between the fixed jaw 2 and the slide 32, is then screwed on the skirt 42 until it abuts against both the lower side 48 of the radial finger member 38 of the slide and the lower surface 50 of the jaw 4 (FIG. 4). The two elements are in this way closely blocked against each other and are rendered interconnected in rotation and in translation.

Figure 6:
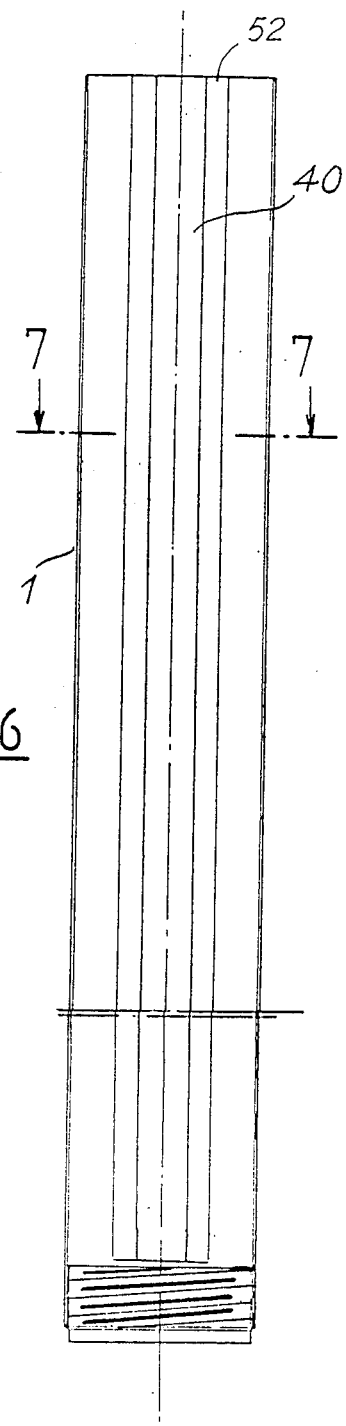
FIG. 6 is an elevational view of a guide tube.
Figure 7:
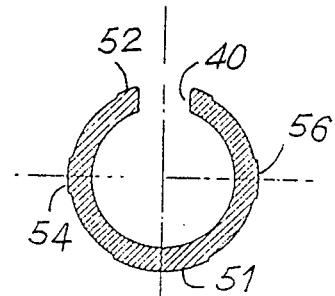
FIG. 7 is a sectional view taken on line 7—7 of FIG. 6.
Figure 8:
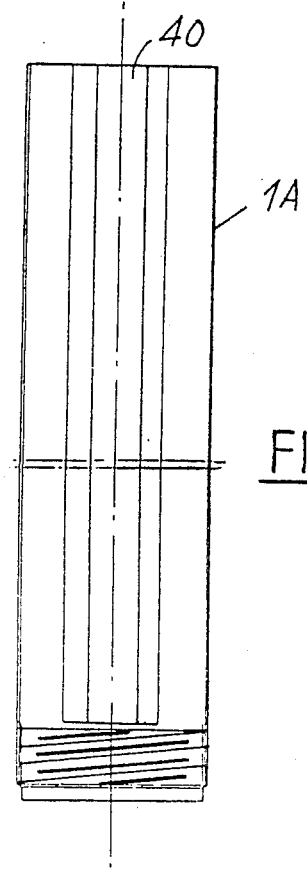
FIG. 8 is an elevational view of a variant of the guide tube.

Preferably, as shown in FIGS. 6, 7 and 8, the guide tube 1 which has a circular section includes on its outer surface at least one longitudinally extending slightly projecting sliding strip 51 which is diametrically opposed to the slot 40, and preferably also narrower projecting strips 52 on each side of slot 40. Other longitudinal projecting strips 54 and 56 may also be provided in intermediate locations between the strip 51 and each of the strips 52, for example at the ends of a diameter perpendicular to the median plane of the slot 40 and the strip 51. The bearing of the jaw 4 on the tube is then limited to the area of the strips, which reduces the friction between the jaw and the tube and facilitates the relative displacements of these two elements in avoiding any jamming effect.

The sliding of the jaw 4 and/or the slide may moreover be still further facilitated by applying on the outer and/or inner walls of the guide tube an anti-friction surface treatment. Such a treatment may also be applied to the outer surface of the slide and/or the inner surface of the bore 12 of the slidable jaw 4.

Further, anti-friction rings or shoes 58 may be mounted inside the body of the jaw 4 in the wall of the bore 12 so as to still further facilitate the sliding of jaw 4.

It will be understood that the guide tube 1 may have lengths which are different in accordance with intended utilizations, as shown at 1 and 1A in FIGS. 6 and 8. The section and the diameter of this tube however remain preferably constant so that it may receive any one of the various jaws all of which have a body 6 provided with a bore 12 of the same dimension, although their arms 7 and 8 have various shapes and/or dimensions.

When the fixed jaw 2 and movable jaw 4 are put in contact with two spread-apart coils 9 and 11 of the coil spring 10 and moved toward each other for compressing this spring, as the slidable jaw 4 is strictly fixed to the slide owing to the fact that it bears against the radial projection 38, the bearing forces of the slidable jaw 4 exerted on the guide tube 1 are transferred and concentrated on the rear portion of the guide tube 1, on one hand, at the point 6 of its inner surface against which bears the upper portion of the sleeve 36 and, on the other hand, at 62 on its outer surface at the point of contact of the latter with the screw-threaded skirt 42. As the axial distance between the bearing regions 60 and 62 is much larger than the radial distance therebetween, which is in fact limited to the thickness of the guide tube 1, risks of wedging are eliminated while the radial forces supported by the guide tube and consequently the resistance to friction opposing the sliding of the jaw are reduced to a minimum.

Furthermore, the bearing region 62 is limited to the longitudinally extending projecting sliding strip 51 and cannot extend laterally therefrom, which could produce a wedging effect.

It is quite clear that the sliding strip or strips could be formed, if desired, on the wall of the bore 12 of the jaw instead of on the tube.

The coil spring compressor arranged in this way therefore permits effecting the mounting and the removal of the springs, and in particular of suspension springs of automobile vehicles, irrespective of the shape and dimensions of the springs, with no danger of a breakage of the assembly of the jaws due to the magnitude of friction against the guide tube.

The jaws 2 and 4 may be removed and replaced by other jaws of different dimensions and shapes in an extremely simple manner since it is sufficient to unscrew the screw-threaded rings 22 and 46 and remove the jaw to be replaced, and then re-introduce other jaws of the same type and put the screw-threaded rings 22, 46 back into position.

A particularly reliable and effective spring compressor is therefore provided with a reduced number of component parts which are easy to manufacture and assemble.

I claim:

1. A coil spring compressor comprising:

a longitudinal guide tube having a longitudinal axis, an axially extending slot in said guide tube;

two jaws provided for the insertion therebetween of respective spaced-apart coils of a compressible coil spring which is to be compressed, said jaws being mounted on said guide tube in confronting relation to each other in a radial plane containing said axis, one said jaw being axially fixed relative to said tube and the other said jaw being axially slidable on said tube, each said jaw comprising in a single piece two arms forming claws or clamps and a tubular body defining a bore having such section relative to a substantially complementary section of said guide tube as to provide a slidable mounting of the respective said jaw on said guide tube;

a slide axially slidably mounted in said guide tube and having a radially extending projecting portion extending through said slot and out of said guide tube;

an actuating screw rotatively mounted in said guide tube on said axis thereof and engaged with said slide for adjusting the axial position of said slide relative to said guide tube by rotation of said screw; and means for rigidly and detachably securing securing said axially slidable jaw to said slide and comprising a screw-threaded skirt coaxial with said bore of said slidable jaw and defining an extension of said bore of said slidable jaw and axially extending from a first side of said slidable jaw directed toward said fixed jaw, a groove provided in said bore of said slidable jaw and in said skirt and axially extending in said radial plane and having a tapering shape in said radial plane with a radial depth which progressively increases from a second side of said slidable jaw remote from said fixed jaw to said first side directed toward said fixed jaw, said groove being continued into said skirt, said radially extending projecting portion of said slide extending into said groove, said groove and said projecting portion each having a substantially rectangular section in a plane perpendicular to said axis, a tapped ring screw-threadedly engageable on said screw-threaded skirt and in axially abutting relation to said projecting portion, said projecting portion having a shape substantially complementary to said tapering shape of said groove, whereby said slidable jaw is rigidly secured to said projecting portion and said slide when said ring is in abutting relation to said projecting portion.

2. A spring compressor according to claim 1, wherein said slide comprises a nut screw-threadedly engaged on said actuating screw and axially extended by a sleeve rigidly connected to said radially projecting portion and in contact with the inner surface of said guide tube at two end portions of said slide so that, in use, radial forces in said radial plane exerted on said slidable jaw by an axial force of compression of the spring being compressed are transferred to a portion of said guide tube opposed to said slot at a point of contact of said guide tube with said sleeve and at a point of contact of said guide tube with said skirt of said slidable jaw.

3. A spring compressor according to claim 2, wherein said sleeve of said slide surrounds said actuating rod without contact therewith.

4. A spring compressor according to claim 1, wherein said guide tube has a substantially circular cross-sectional shape and includes on an outer surface thereof at least one longitudinally extending slightly radially projecting sliding strip which is diametrically opposed to said longitudinal slot in said guide tube.

5. A spring compressor according to claim 1, wherein said guide tube includes on an outer surface thereof a plurality of longitudinally extending and radially projecting strips spaced about the periphery of said guide tube, said slidable jaw bearing against said strips.

6. A spring compressor according to claim 5, wherein said guide tube includes said longitudinally extending radially projecting strips adjacent each of the sides of said slot, on a part of said guide tube opposed to said slot, and in locations intermediate therebetween.

7. A spring compressor according to claim 1, wherein an anti-friction surface treatment is applied to at least one of the inner and outer surfaces of said guide tube and a surface of said bore of said slidable jaw.

8. A spring compressor according to claim 1, wherein said bore of said slidable jaw is provided with anti-friction members which facilitate the sliding of said slidable jaw along said guide tube.

* * * * *